United States Patent
Mitsushima et al.

(10) Patent No.: US 11,866,834 B2
(45) Date of Patent: Jan. 9, 2024

(54) ELECTROLYSIS ELECTRODE AND METHOD FOR MANUFACTURING SAME

(71) Applicants: DE NORA PERMELEC LTD, Fujisawa (JP); KAWASAKI JUKOGYO KABUSHIKI KAISHA, Kobe (JP)

(72) Inventors: Shigenori Mitsushima, Yokohama (JP); Yoshiyuki Kuroda, Yokohama (JP); Ikuo Nagashima, Kobe (JP); Tatsuya Taniguchi, Kobe (JP); Yoshinori Nishiki, Fujisawa (JP); Akihiro Kato, Fujisawa (JP); Awaludin Zaenal, Fujisawa (JP); Fumiya Tsujii, Fujisawa (JP); Takaaki Nakai, Fujisawa (JP)

(73) Assignees: DE NORA PERMELEC LTD, Fujisawa (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/975,868
(22) PCT Filed: Mar. 4, 2019
(86) PCT No.: PCT/JP2019/008289
§ 371 (c)(1),
(2) Date: Aug. 26, 2020
(87) PCT Pub. No.: WO2019/172160
PCT Pub. Date: Sep. 12, 2019

(65) Prior Publication Data
US 2020/0407860 A1 Dec. 31, 2020

(30) Foreign Application Priority Data
Mar. 7, 2018 (JP) .................. 2018-040569

(51) Int. Cl.
*C25B 11/077* (2021.01)
*C23C 18/12* (2006.01)

(52) U.S. Cl.
CPC ...... *C25B 11/0771* (2021.01); *C23C 18/1216* (2013.01); *C25B 11/0773* (2021.01)

(58) Field of Classification Search
CPC .......... C25B 1/04–1/044; C25B 11/00; C25B 11/04; C25B 11/051; C25B 11/073; C25B 11/077; C25B 11/0771; C25B 11/0773
See application file for complete search history.

(56) References Cited

U.S. PATENT DOCUMENTS

| 2,928,783 A | 3/1960 | Bacon |
| 10,619,255 B2 * | 4/2020 | Kato ............... B01J 23/002 |

(Continued)

FOREIGN PATENT DOCUMENTS

| GB | 864457 | 4/1961 |
| IN | 0364/DEL/2001 | 5/2006 |

(Continued)

OTHER PUBLICATIONS

Reimers et al ("Crystal structure of LixNi2-xO2 and a lattice-gas model for the order-disorder transition", Physical Review B, vol. 46, No. 6, 1992, pp. 3236-3246). (Year: 1992).*

(Continued)

*Primary Examiner* — Alexander W Keeling
(74) *Attorney, Agent, or Firm* — Hamre, Schumann, Mueller & Larson, P.C.

(57) ABSTRACT

The present invention provides an electrode for electrolysis in which electrolysis performance is hard to deteriorate and excellent catalytic activity is kept stable over a long period of time even when electric power in which there is a large fluctuation in output, such as renewable energy, is used as a power source. The electrode for electrolysis is an electrode (Continued)

10 for electrolysis provided with an electrically conductive substrate 2 at least the surface of which contains nickel or a nickel-based alloy, an intermediate layer 4 formed on the surface of the electrically conductive substrate 2 and containing a lithium-containing nickel oxide represented by composition formula $Li_xNi_{2-x}O_2$ ($0.02 \leq x \leq 0.5$), and a catalyst layer 6 of a nickel cobalt spinel oxide, an iridium oxide, or the like, the catalyst layer 6 formed on the surface of the intermediate layer 4.

6 Claims, 8 Drawing Sheets

(56) References Cited

U.S. PATENT DOCUMENTS

| | | | |
|---|---|---|---|
| 10,676,832 B2 | 6/2020 | Mitsushima et al. | |
| 2008/0230380 A1* | 9/2008 | Ohsaka | C25B 11/0484 204/290.09 |
| 2016/0237578 A1* | 8/2016 | Ichikawa | C25B 11/061 |

FOREIGN PATENT DOCUMENTS

| | | |
|---|---|---|
| JP | 8-106902 A | 4/1996 |
| JP | 2015-086420 | 5/2015 |
| JP | 2017-190476 | 10/2017 |
| JP | 2017-538250 | 12/2017 |
| JP | 2018-178221 | 11/2018 |
| JP | 6975297 | 12/2021 |
| WO | 2018/047961 | 3/2018 |
| WO | 2019172160 | 9/2019 |
| WO | 2020-032256 | 2/2020 |

OTHER PUBLICATIONS

Kalyani et al ("Various aspects of LiNiO2 chemistry: A review", Science and Technology of Advanced Materials, 6, 2005, pp. 689-703). (Year: 2005).*

Korean Office Action, issued in the corresponding Korean application No. 10-2020-7028348, dated Oct. 20, 2020, 11 pages (including translation).

Fujita et al., "The Effect of LixNi2-xO2/Ni with Modification Method on Activity and Durability of Alkaline Water Electrolysis Anode", Electrocatalysis, No. 9, 2018, pp. 162-171.

International Preliminary Report on Patentability, issued in the corresponding PCT application No. PCT/JP2019/008289, dated Sep. 8, 2020, 9 pages (including translation).

International Search Report, issued in the corresponding PCT application No. PCT/JP2019/008289, dated Apr. 2, 2019, 5 pages (including translation).

Lu et al., "Eiectrochemical-Ellipsometric Studies of Oxide Film Formed on Nickel during Oxygen Evolution", J. Elelctrochem. Soc.: Electrochemical Science and Technology, vol. 125, No. 9, pp. 1416-1422, Sep. 1978, 7 pages.

Bowen et al., "Developments in Advanced Alkaline Water Electrolysis", Int. J. Hydrogen Energy, vol. 9, No. 1/2, pp. 59-66, 1984, 8 pages.

Mitsushima et al., "Present technologies and subjects of water electrolysis", Hydrogen Energy Systems, vol. 36, No. 1, pp. 11-16, 2011, 6 pages (English Abstract included).

Singh et al., "Electrocatalytic activity of metal-substituted Fe3O4 obtained at low temperature for O2 evolution", International Journal of Hydrogen Energy, vol. 24, pp. 433-439, 1999, 7 pages.

Nadesan et al., "Oxygen Evolution on Nickel Oxide Electrodes", J. Electrochem. Soc., vol. 132, No. 12, Dec. 1985, pp. 2957-2959, 3 pages.

Zhu et al., "Layered Fe-Substituted LiNiO2 Electrocatalysts for High-Efficiency Oxygen Evolution Reaction," ACS Energy Letters, vol. 2, pp. 1654-1660, 2017, 7 pages.

Gupta et al., "High-Rate Oxygen Evolution Reaction on Al-Doped LiNiO2," Advanced Materials, vol. 37, pp. 6063-6067, 2015, 5 pages.

Menezes et al., "Using nickel manganese oxide catalysts forefficient water oxidation", ChemCommun, The Royal Society of Chemistry, vol. 51, pp. 5005-5008, 2015.

Korean Office Action, issued in the related Korean patent application No. 10-2023-7014450, dated Jul. 8, 2023, 8 pages (with machine translation).

Restriction Requirement, issued in U.S. Appl. No. 18/248,848, dated Aug. 23, 2023, 9 pages.

Hu et al., "Oxygen-Release-Related Thermal Stability and Decomposition Pathways of LixNi0.5Mn1.5O4 Cathode Materials", Chemistry of Materials, 2014, vol. 26, No. 2, pp. 1108-1118.

Wei et al., "Facile synthesis of NiMn2O4 nanosheet arrays grown on nickel foam as novel electrode materials for high-performance supercapacitors", Ceramics International vol. 42, 2016, pp. 14963-14969.

Alagar et al., "Synthesize of porous LiNi0.5Mn1.5O4 microcubes for lithium-ion battery and supercapacitor applications ", J. Mater. Sci: Mater Electron (2018) 29: pp. 1173-1181, 9 pages.

Kishida et al., "Thermodynamic analysis using first-principles calculations of phases and structures of LixNi0.5Mn1.5O4 ($0 \leq x \leq 1$)", Journal of Power Sources, 241 (2013) pp. 1-5, 5 pages.

Miyazaki et al., "On the behavior of the selective oxidation by LiNiO2: Oxidative coupling of methane", Res. Chem. Intermed, Vo. 28, No. 5, pp. 479-484 (2002), 6 pages.

Office Action, issued in U.S. Appl. No. 18/248,848, dated Nov. 13, 2023, 21 pages.

* cited by examiner

[Figure 1]
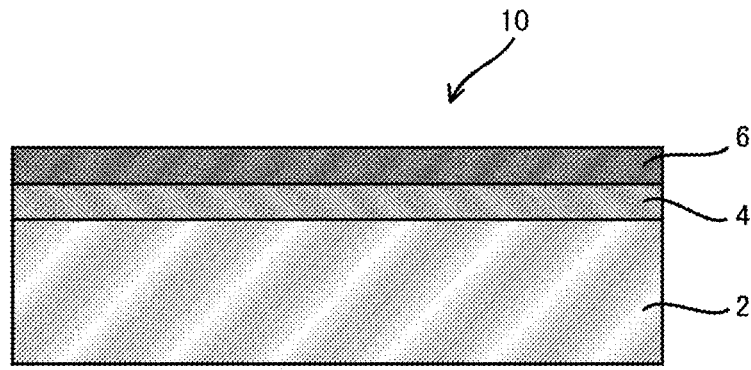
[Figure 2]
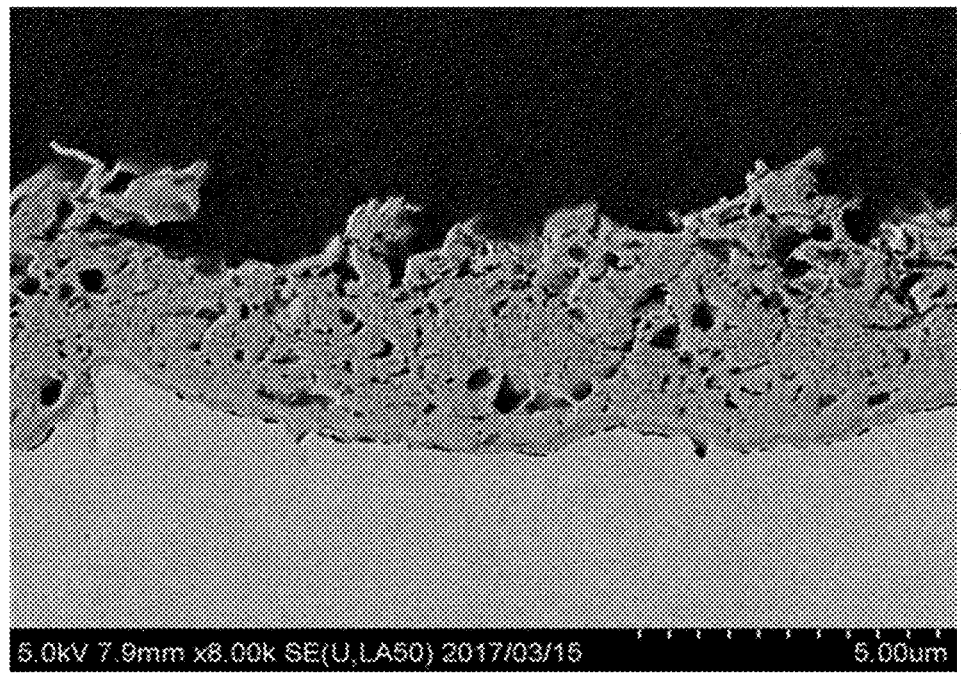

[Figure 3]
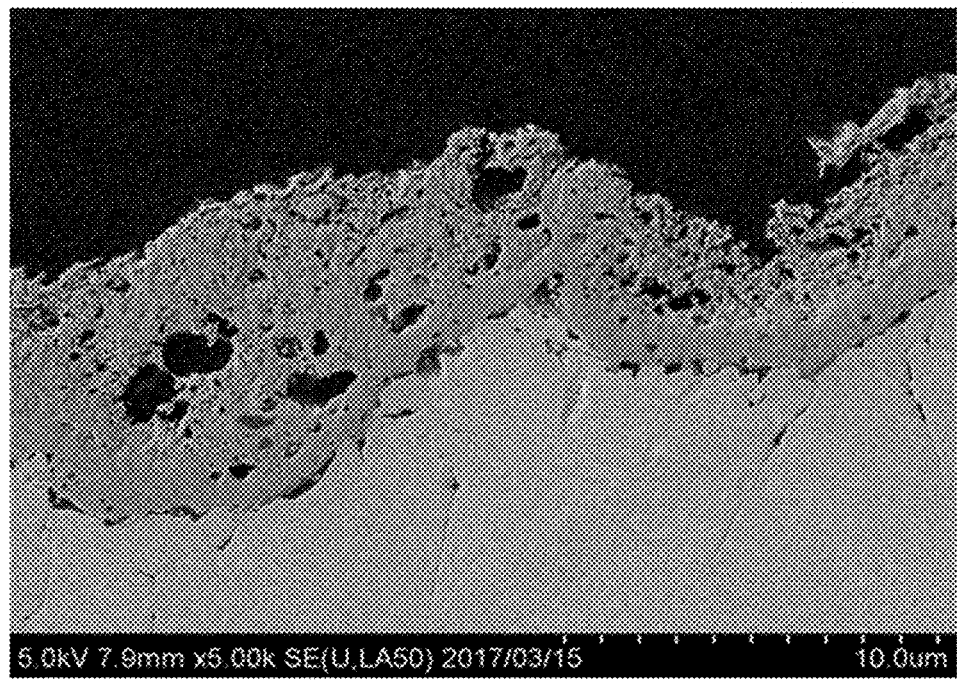
[Figure 4]
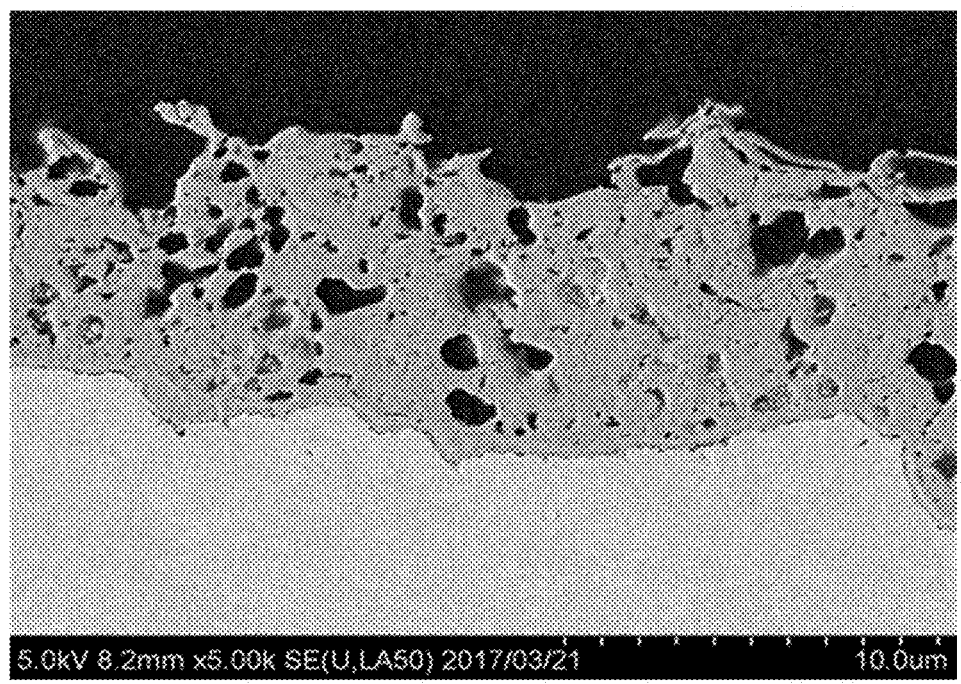

[Figure 5]
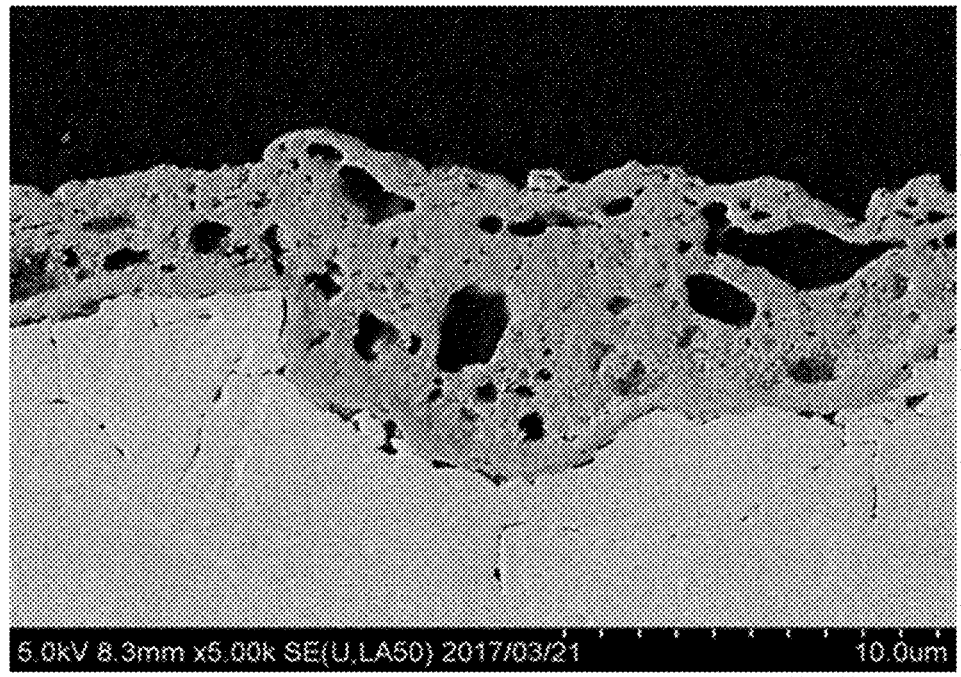
[Figure 6]
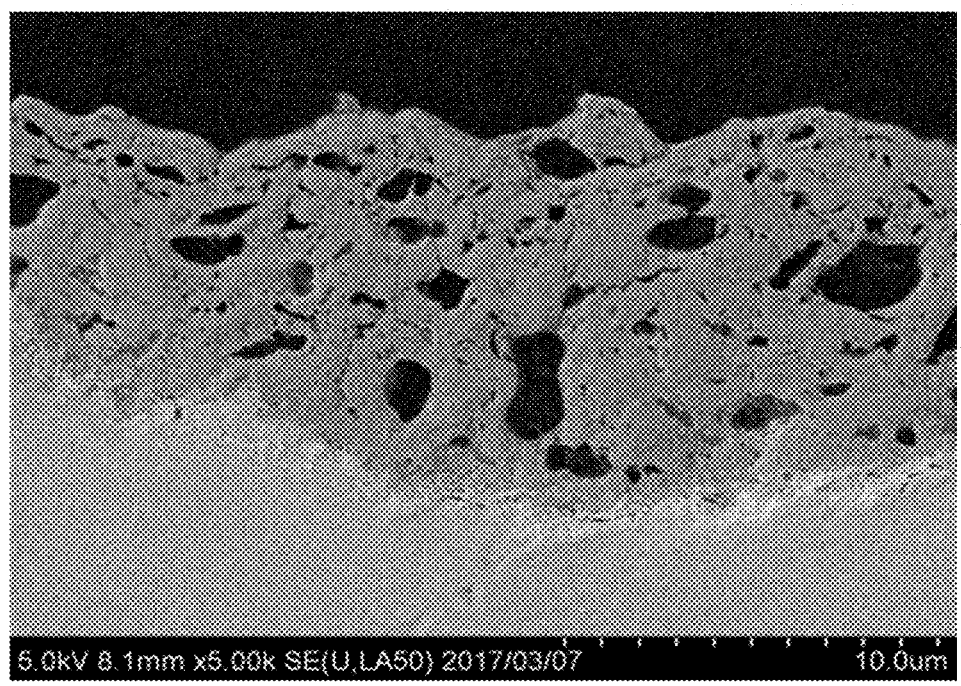

[Figure 7]
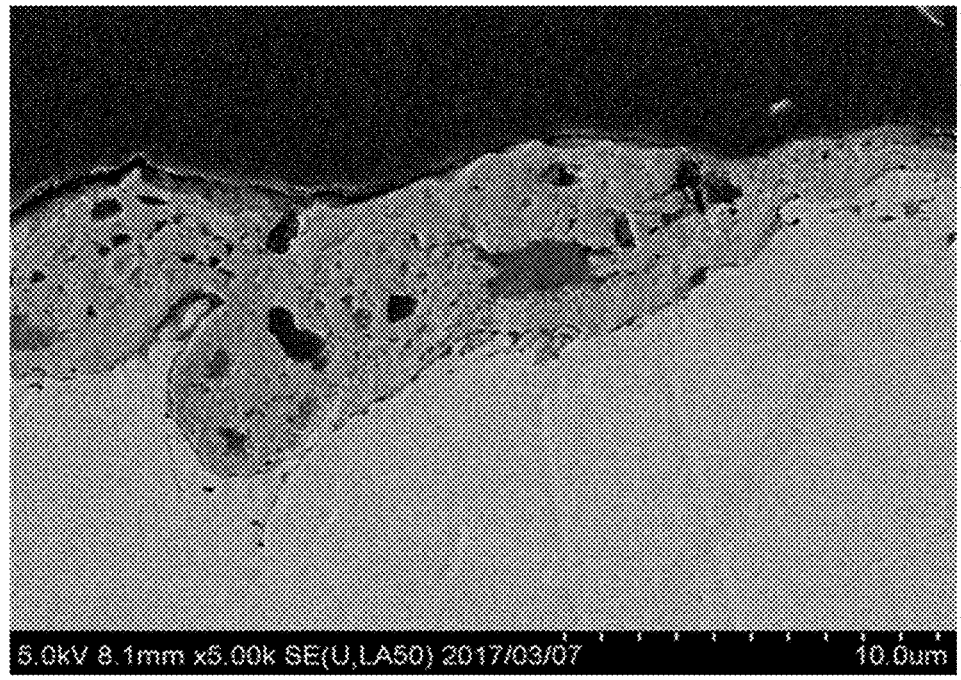
[Figure 8]
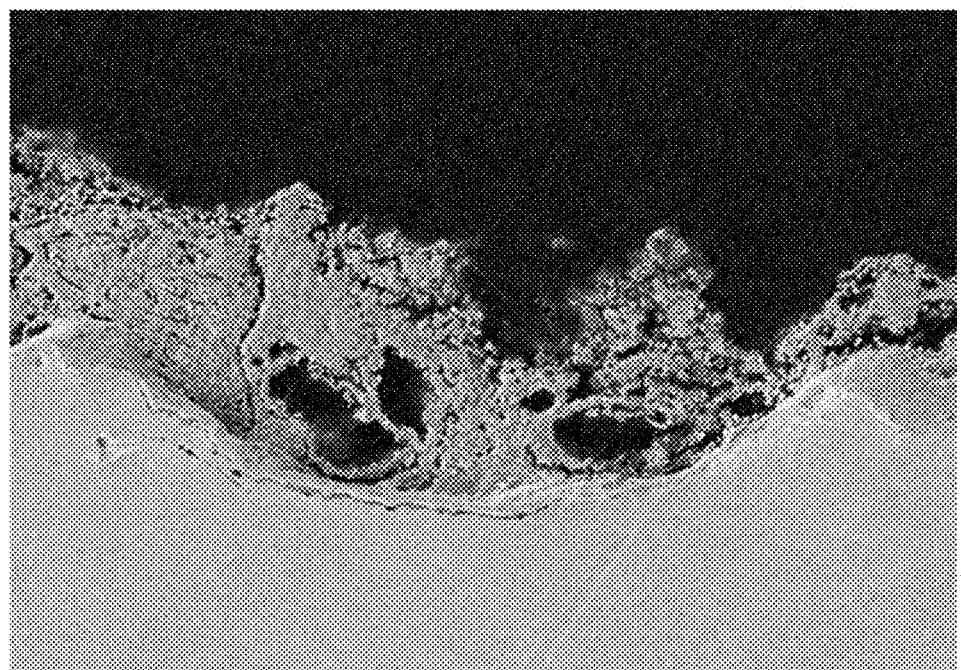

[Figure 9]
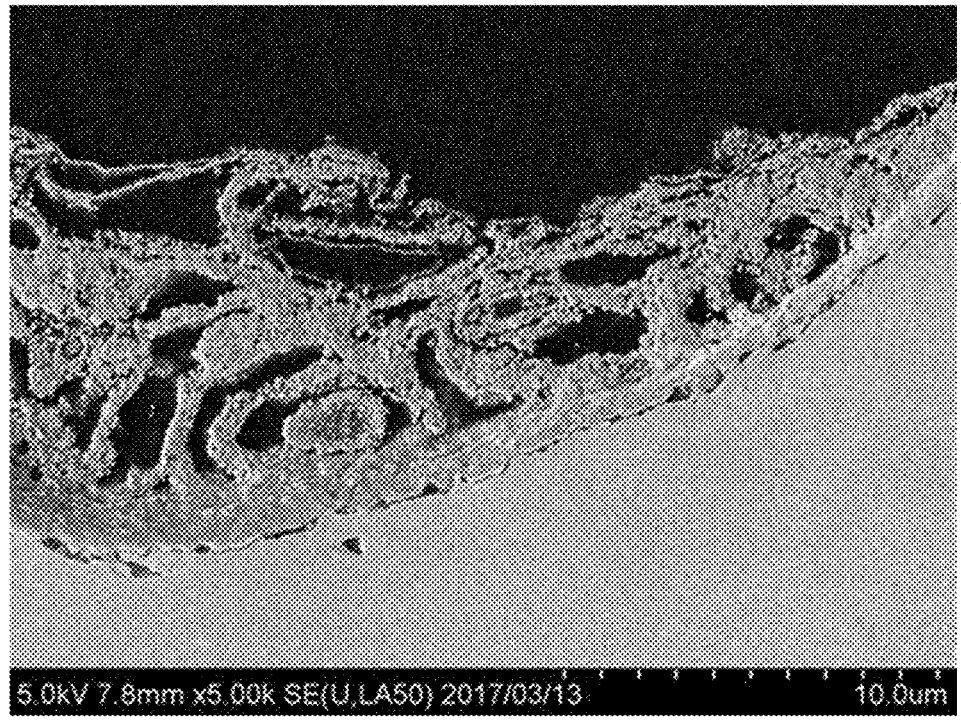
[Figure 10]
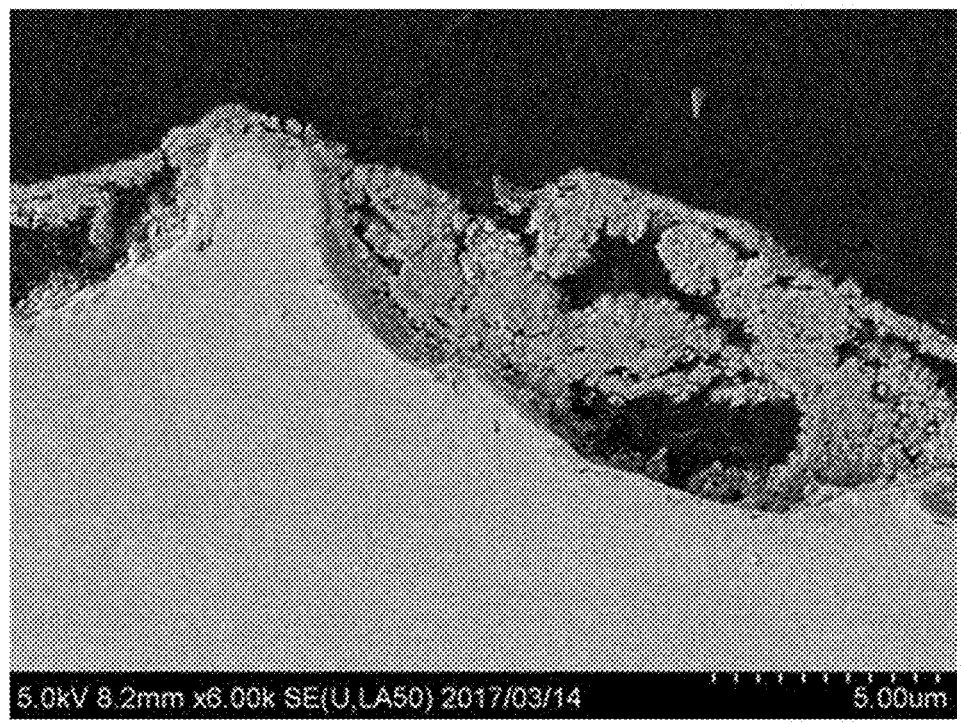

[Figure 11]
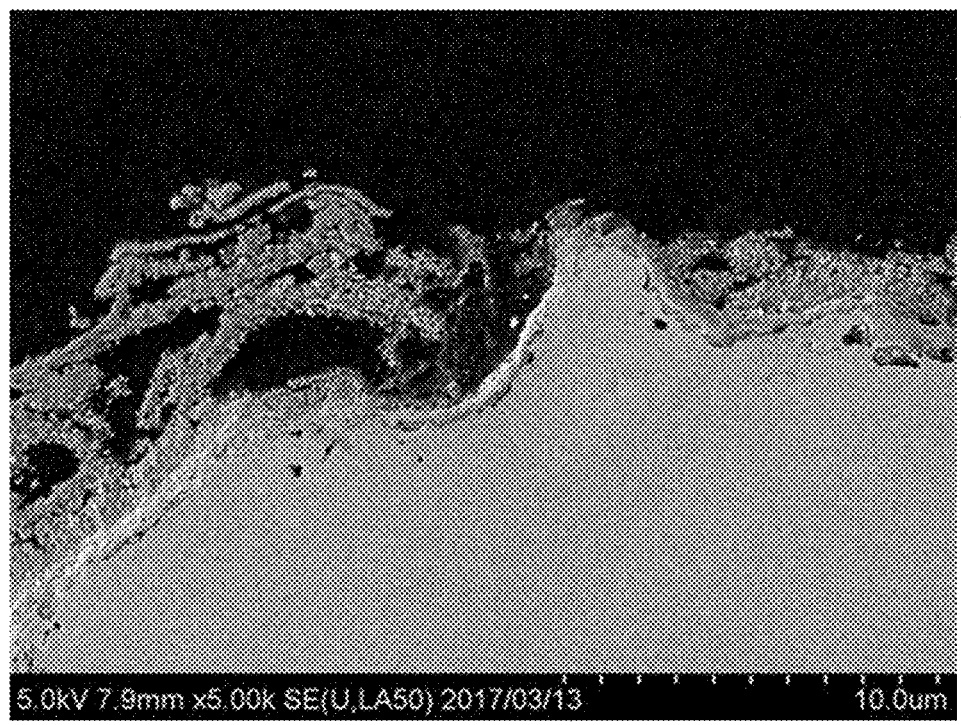
[Figure 12]
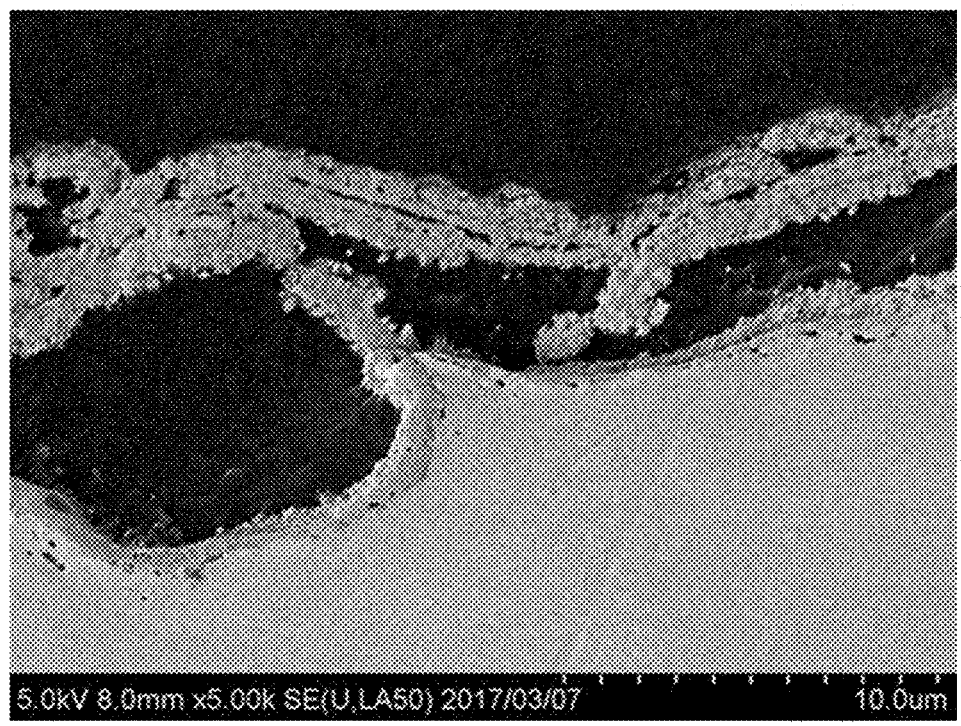

[Figure 13]
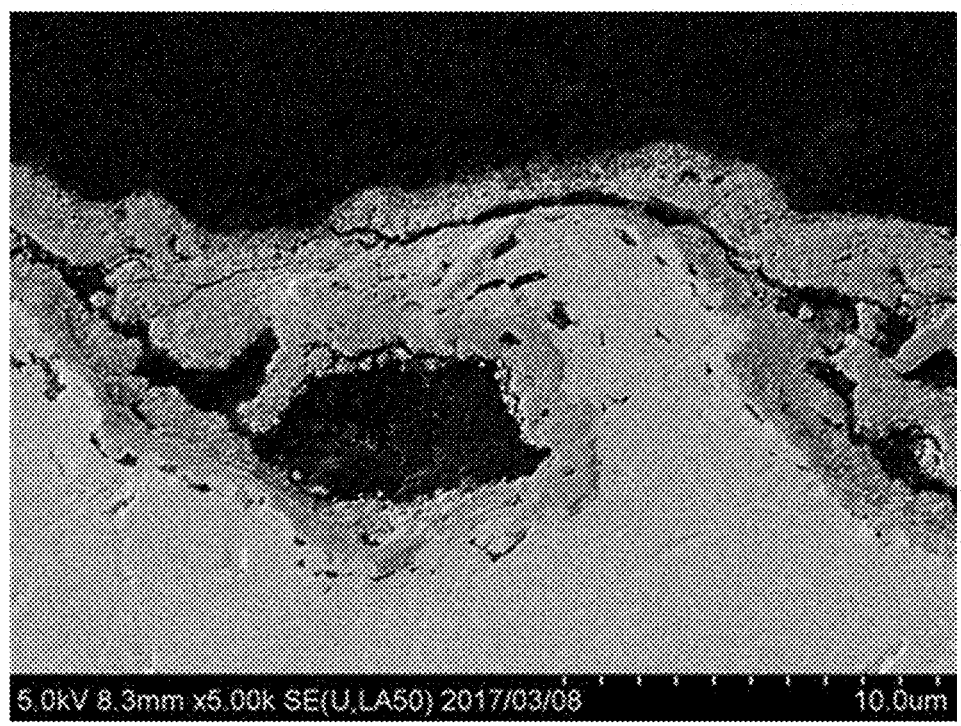

[Figure 14]
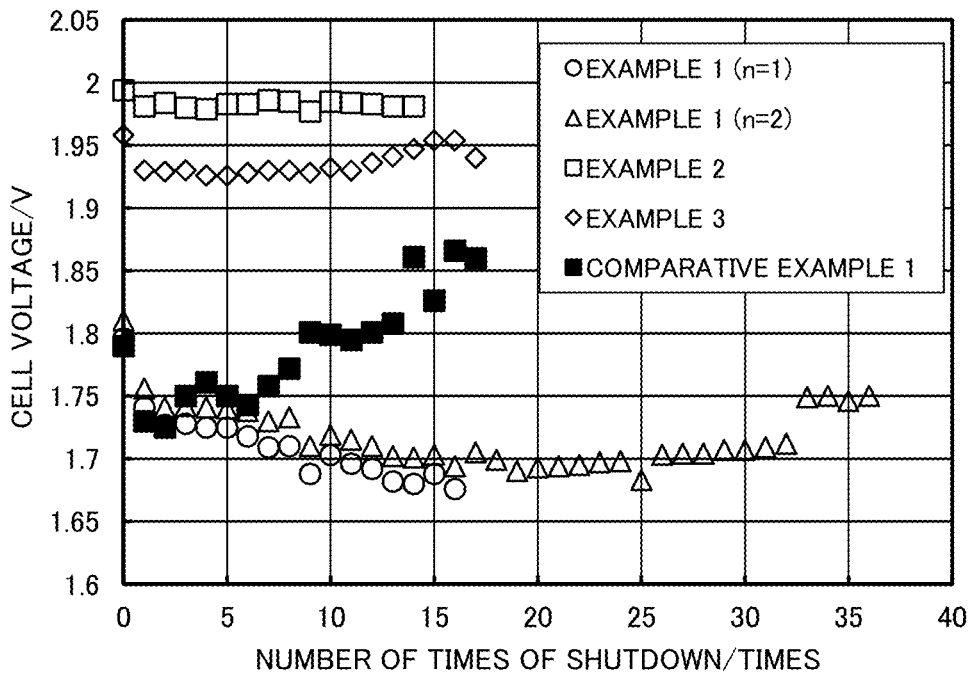
[Figure 15]
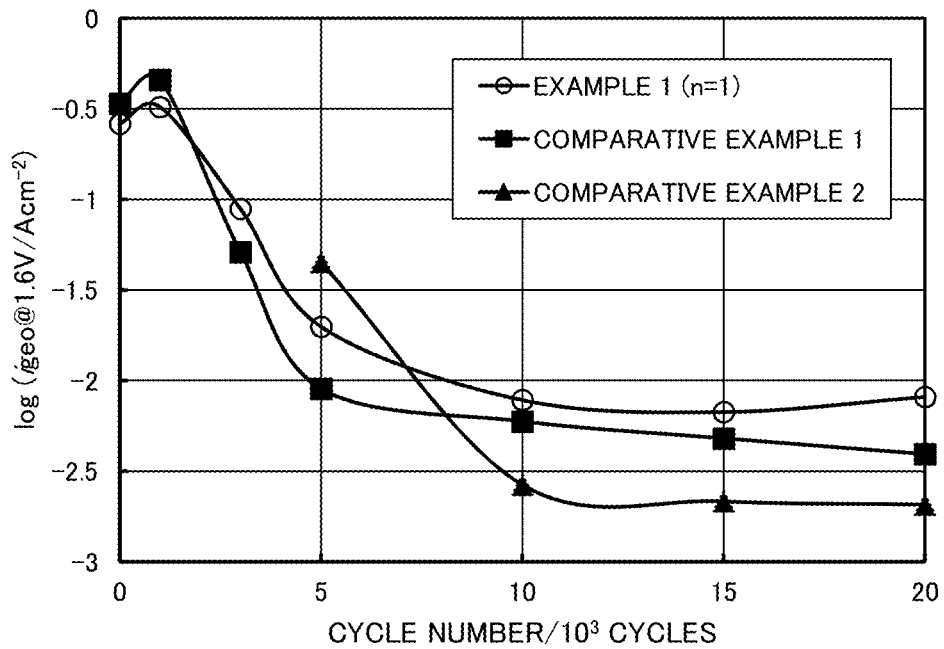

ELECTROLYSIS ELECTRODE AND METHOD FOR MANUFACTURING SAME

TECHNICAL FIELD

The present invention relates to an electrode for electrolysis and a method for producing the same.

BACKGROUND ART

Hydrogen is secondary energy that is suitable for storage and transportation and gives small environmental load, and therefore a hydrogen energy system using hydrogen as an energy carrier has been attracting attention. Currently, hydrogen is mainly produced by: steam reforming of fossil fuels; and other methods, but the importance of alkaline water electrolysis using renewable energy as a power source has been increasing from the viewpoint of global warming and a problem of exhaustion of fossil fuels.

Water electrolysis is roughly classified into two. The one is alkaline water electrolysis, in which a high-concentration alkali aqueous solution is used as an electrolyte. The other is solid polymer type water electrolysis, in which a solid polymer electrolyte membrane (SPE) is used as an electrolyte. It is said that when large-scale hydrogen production is carried out by water electrolysis, the alkaline water electrolysis using an inexpensive material such as an iron group metal like nickel is more suitable than the solid polymer type water electrolysis using an electrode in which a large amount of an expensive noble metal is used.

In the high-concentration alkali aqueous solution, the electrical conductivity becomes high as the temperature rises, but the corrosiveness also becomes high as the temperature rises. Therefore, the upper limit of the operating temperature is controlled to about 80 to about 90° C. Electrolysis performance has been improved up to about 1.7 to about 1.9 V (78 to 87% in terms of efficiency) in a current density of 0.3 to 0.4 Acm$^{-2}$ due to development of constituent materials and various piping materials for an electrolytic bath, which are resistant to a high-temperature, high-concentration alkali aqueous solution, and development of a low-resistance separator and an electrode having an enlarged surface area and containing a catalyst added therein.

A nickel-based material which is stable in a high-concentration alkali aqueous solution has been used as an anode for alkaline water electrolysis, and it is reported that a nickel-based anode has a life of several decades or longer in the case of alkaline water electrolysis using a stable power source (Non Patent Literatures 1 and 2). However, when renewable energy is used as a power source, severe conditions, such as extremely frequent starts/stops and load fluctuation, are brought about in many cases, so that deterioration in the performance of the nickel-based anode has been regarded as a problem (Non Patent Literature 3).

Both of the reaction of producing a nickel oxide and the reduction reaction of the produced nickel oxide progress on a metal surface. Therefore, detachment of an electrode catalyst formed on the metal surface is facilitated with these reactions. When the electric power for electrolysis is not supplied, the electrolysis stops, and the nickel-based anode is kept at a potential which is lower than the oxygen-generating potential (1.23 V vs. RHE) and is higher than the potential (0.00 V vs. RHE) of a hydrogen-generating cathode which is a counter electrode. Electromotive force due to various chemical species is generated in a cell, and by the progress of a battery reaction, the anode potential is kept low and the reduction reaction of the nickel oxide is facilitated.

An electric current generated by the battery reaction leaks through piping which connects cells in the case of an electrolytic bath in which a plurality of cells is combined. Examples of the countermeasure for preventing such a leak of the electric current include a method of allowing a weak electric current to flow continuously during a stop. However, allowing a weak electric current to flow continuously during a stop needs special power supply control and leads to generation of oxygen and hydrogen at all times, and therefore has a problem of taking excessive labor for operation management. In addition, it is possible to prevent the battery reaction by removing a liquid immediately after a stop in order to avoid a reverse current state intentionally; however, such measure cannot necessarily be said to be proper measure when operation with electric power in which there is a large fluctuation in output, such as renewable energy, is assumed.

In the past, a platinum group metal, a platinum group metal oxide, a valve metal oxide, an iron group oxide, a lanthanide group metal oxide, or the like has been utilized as a catalyst (anode catalyst) for an oxygen-generating anode which is used for alkaline water electrolysis. As other anode catalysts, alloy-based catalysts, such as Ni—Co and Ni—Fe, in which nickel is used as a base; nickel having an enlarged surface area; electrically conductive oxides (ceramic materials), such as spinel-based $Co_3O_4$ and $NiCo_2O_4$, and perovskite-based $LaCoO_3$ and $LaNiO_3$; noble metal oxides; oxides containing a lanthanide group metal and a noble metal; and the like are also known (Non Patent Literature 4).

As an oxygen-generating anode which is used for high-concentration alkaline water electrolysis, an anode having a lithium-containing nickel oxide layer formed in advance on a surface of a nickel substrate is known (Patent Literatures 1 and 2). In addition, an anode for alkaline water electrolysis having a lithium-containing nickel oxide catalyst layer containing lithium and nickel in a predetermined molar ratio, the lithium-containing nickel oxide catalyst layer formed on a surface of a nickel substrate, (Patent Literature 3), and an anode for alkaline water electrolysis having a catalyst layer containing a nickel cobalt-based oxide, and an iridium oxide or a ruthenium oxide, the catalyst layer formed on a surface of a nickel substrate, (Patent Literature 4) are proposed.

CITATION LIST

Patent Literature

Patent Literature 1: British Patent Laid-Open No. 864457
Patent Literature 2: U.S. Pat. No. 2,928,783
Patent Literature 3: Japanese Patent Laid-Open No. 2015-86420
Patent Literature 4: Japanese Patent Laid-Open No. 2017-190476

Non Patent Literature

Non Patent Literature 1: P. W. T. Lu, S. Srinivasan, J. Electrochem. Soc., 125, 1416(1978)
Non Patent Literature 2: C. T. Bowen, Int. J. Hydrogen Energy, 9, 59(1984)
Non Patent Literature 3: MITSUSHIMA Shigenori, MATSUZAWA Koichi, "Hydrogen Energy System", 36, 11(2011)
Non Patent Literature 4: J. P. Singh, N. K. Singh, R. N. Singh, Int. J. Hydrogen Energy, 24, 433 (1999)

SUMMARY OF INVENTION

Technical Problem

However, there have been problems that when electric power in which there is a large fluctuation in output, such as renewable energy, is used as a power source, the performance is easily deteriorated and stable use over a long period of time is difficult even in the alkaline water anodes for electrolysis proposed in Patent Literatures 1 to 4.

The present invention has been completed in view of such problems of the conventional techniques, and an object of the present invention is to provide an electrode for electrolysis in which electrolysis performance is hard to deteriorate and excellent catalytic activity is kept stable over a long period of time even when electric power in which there is a large fluctuation in output, such as renewable energy, is used as a power source. In addition, another object of the present invention is to provide a method for producing the electrode for electrolysis.

Solution to Problem

The present inventors have conducted diligent studies in order to solve the problems to find out that the problems can be solved by disposing a catalyst layer on a surface of an electrically conductive substrate through an intermediate layer containing a lithium-containing nickel oxide represented by predetermined composition formula, and have completed the present invention.

That is, according to the present invention, an electrode for electrolysis described below is provided.

[1] An electrode for electrolysis provided with: an electrically conductive substrate at least a surface of which contains nickel or a nickel-based alloy; an intermediate layer formed on the surface of the electrically conductive substrate and containing a lithium-containing nickel oxide represented by composition formula $Li_xNi_{2-x}O_2$ ($0.02 \leq x \leq 0.5$); and a catalyst layer formed on a surface of the intermediate layer.

[2] The electrode for electrolysis according to [1], wherein the intermediate layer has a layer average density of 5.1 g/cm$^3$ or more and 6.67 g/cm$^3$ or less.

[3] The electrode for electrolysis according to [1] or [2], wherein the catalyst layer contains at least one catalyst selected from the group consisting of a nickel cobalt spinel oxide, a lanthanide nickel cobalt perovskite oxide, an iridium oxide, a ruthenium oxide, and a lithium nickel cobalt oxide.

In addition, according to the present invention, a method for producing an electrode for electrolysis, the method described below, is provided.

[4] A method for producing an electrode for electrolysis being a method for producing the electrode for electrolysis according to any one of [1] to [3], the method including: a step of applying an aqueous solution containing a lithium ion and a nickel ion on a surface of an electrically conductive substrate at least a surface of which contains nickel or a nickel-based alloy; a step of heat-treating the electrically conductive substrate having the aqueous solution applied thereon, thereby forming an intermediate layer containing a lithium-containing nickel oxide represented by composition formula $Li_xNi_{2-x}O_2$ ($0.02 \leq x \leq 0.5$) on the surface of the electrically conductive substrate; and a step of forming a catalyst layer on a surface of the formed intermediate layer.

[5] The method for producing an electrode for electrolysis according to [4], wherein the aqueous solution is prepared by dissolving at least one of a nickel carboxylate and a lithium carboxylate in water.

[6] The method for producing an electrode for electrolysis according to [4] or [5], further comprising a step of performing a heat treatment at 450° C. or higher and 600° C. or lower after forming the catalyst layer.

Advantageous Effects of Invention

According to the present invention, an electrode for electrolysis in which electrolysis performance is hard to deteriorate and excellent catalytic activity is kept stable over a long period of time even when electric power in which there is a large fluctuation in output, such as renewable energy, is used as a power source can be provided. In addition, according to the present invention, a method for producing the electrode for electrolysis can be provided.

BRIEF DESCRIPTION OF DRAWINGS

FIG. 1 is a sectional view schematically illustrating one embodiment of an electrode for electrolysis of the present invention.

FIG. 2 is a SEM image of a cross section of an intermediate of sample 1.

FIG. 3 is a SEM image of a cross section of an intermediate of sample 2.

FIG. 4 is a SEM image of a cross section of an intermediate of sample 3.

FIG. 5 is a SEM image of a cross section of an intermediate of sample 4.

FIG. 6 is a SEM image of a cross section of an intermediate of sample 5.

FIG. 7 is a SEM image of a cross section of an intermediate of sample 6.

FIG. 8 is a SEM image of a cross section of an intermediate of sample 7.

FIG. 9 is a SEM image of a cross section of an intermediate of sample 8.

FIG. 10 is a SEM image of a cross section of an intermediate of sample 9.

FIG. 11 is a SEM image of a cross section of an intermediate of sample 10.

FIG. 12 is a SEM image of a cross section of an intermediate of sample 11.

FIG. 13 is a SEM image of a cross section of an intermediate of sample 12.

FIG. 14 is a graph showing relationships between the number of times of shutdown and cell voltage.

FIG. 15 is a graph showing a change in current density of each sample obtained by an accelerated life test.

DESCRIPTION OF EMBODIMENTS

<Electrode for Electrolysis>

FIG. 1 is a sectional view schematically illustrating one embodiment of an electrode for electrolysis of the present invention. As illustrated in FIG. 1, an electrode 10 for electrolysis of the present embodiment is provided with: an electrically conductive substrate 2; an intermediate layer 4 formed on the surface of the electrically conductive substrate 2; and a catalyst layer 6 formed on the surface of the intermediate layer 4. Hereinafter, details on the of the present invention will be described with reference to appended drawings.

(Electrically Conductive Substrate)

The electrically conductive substrate 2 is an electric conductor for conducting electricity for electrolysis and is a member having a function as a carrier for carrying the intermediate layer 4 and the catalyst layer 6. At least the surface of the electrically conductive substrate 2 (the face where the intermediate layer 4 is to be formed) is formed with nickel or a nickel-based alloy. That is, the whole of the electrically conductive substrate 2 may be formed with nickel or a nickel-based alloy, or only the surface thereof may be formed with nickel or a nickel-based alloy. Specifically, the electrically conductive substrate 2 may be such that a coating of nickel or a nickel-based alloy is formed by plating or the like on the surface of a metal material, such as iron, stainless steel, aluminum, or titanium.

The thickness of the electrically conductive substrate is preferably 0.05 to 5 mm. The shape of the electrically conductive substrate is preferably a shape having an opening for removing bubbles of oxygen, hydrogen, and the like to be produced. For example, expanded mesh or porous, expanded mesh can be used as the electrically conductive substrate. When the electrically conductive substrate has a shape having an opening, the aperture ratio of the electrically conductive substrate is preferably 10 to 95%.

(Intermediate Layer)

The intermediate layer 4 is a layer which is formed on the surface of the electrically conductive substrate 2. The intermediate layer 4 suppresses corrosion or the like of the electrically conductive substrate 2 and fixes the catalyst layer 6 firmly to the electrically conductive substrate 2 in a stable manner. In addition, the intermediate layer 4 also plays a role of smoothly supplying an electric current to the catalyst layer 6. The intermediate layer 4 is formed with a lithium-containing nickel oxide represented by composition formula $Li_xNi_{2-x}O_2$ ($0.02 \leq x \leq 0.5$). When x in the composition formula is less than 0.02, the electric conductivity is insufficient. On the other hand, when x exceeds 0.5, the physical strength and the chemical stability are deteriorated. The intermediate layer 4 formed with the lithium-containing nickel oxide represented by the composition formula has electric conductivity sufficient for electrolysis and exhibits excellent physical strength and chemical stability even when it is used for a long period of time.

The thickness of the intermediate layer is preferably 0.01 μm or more and 100 μm or less, more preferably 0.1 μm or more and 10 μm or less. When the thickness of the intermediate layer is less than 0.01 μm, the above-mentioned functions are not exhibited. On the other hand, even if the thickness of the intermediate layer is set in such a way as to exceed 100 μm, a voltage loss due to the resistance at the intermediate layer is large to make it difficult to exhibit the above-mentioned functions and make the electrode for electrolysis somewhat disadvantageous in terms of production costs and the like in some cases.

The layer average density of the intermediate layer is preferably 5.1 g/cm$^3$ or more and 6.67 g/cm$^3$ or less, more preferably 5.1 g/cm$^3$ or more and 6.0 g/cm$^3$ or less, and particularly preferably 5.5 g/cm$^3$ or more and 6.0 g/cm$^3$ or less. The intermediate layer preferably has a small proportion of pores formed therein and is dense. Specifically, the porosity of the intermediate layer (a value of an area ratio of the pores (voids) in the whole intermediate layer) is preferably 0.29 or less, more preferably 0.18 or less. It is to be noted that the porosity of the intermediate layer can be calculated by performing image analysis of a cross-sectional photograph (SEM image) of a section of the intermediate layer using image processing software or the like, which is an accessory of a commercially available CCD digital microscope (for example, trade name "MSX-500Di" manufactured by MORITEX Corporation) for image processing.

The layer average density (apparent density D) of the intermediate layer formed on the surface of the electrically conductive substrate can be measured and calculated according to the following procedure. Firstly, image analysis of a cross-sectional photograph (SEM image) of a section of the intermediate layer is performed to calculate the porosity of the intermediate layer. The true density of the lithium-containing nickel oxide (LiNiO) herein is 6.67 g/cm$^3$. Therefore, the layer average density (apparent density D) can be calculated from the following equation (1).

$$\text{Layer average density (g/cm}^3\text{)} = 6.67 \times (1 - \text{porosity}) \quad (1)$$

(Catalyst Layer)

The catalyst layer 6 is a layer which is formed on the surface of the intermediate layer 4 and has catalytic ability. The catalyst layer 6 is fixed on the electrically conductive substrate 2 with sufficient strength by interposing the intermediate layer 4 therebetween. The type of a catalyst contained in the catalyst layer 6 is not particularly limited, and a catalyst having catalytic ability according to the purpose can be selected and used. For example, when the electrode 10 for electrolysis is an anode for alkaline water electrolysis, the catalyst layer 6 can be constituted by a catalyst which is used for an anode for alkaline water electrolysis. In addition, when the electrode 10 for electrolysis is a cathode for alkaline water electrolysis, the catalyst layer 6 can be constituted by a catalyst which is used for a cathode for alkaline water electrolysis.

Specific examples of the catalyst include a nickel cobalt spinel oxide ($NiCo_2O_4$), a lanthanide nickel cobalt perovskite oxide, an iridium oxide, a ruthenium oxide, and a lithium nickel cobalt oxide. The lanthanide nickel cobalt perovskite oxide has structural formula $XNi_aCo_{1-a}O_3$ (X represents at least one metal selected from lanthanum, cerium, and praseodymium, and $0<a<1$). The catalyst layer may be formed using one of these catalysts, or the catalyst layer may be formed using a plurality of catalysts among these catalysts. When a plurality of catalysts is used, a single-layered catalyst layer can be made by mixing the components. In addition, the catalyst layer can also be made by laminating layers of respective catalyst components. When lamination is performed, each layer may be constituted by one type of catalyst, or may be constituted as a layer in which a plurality of catalysts is mixed. For example, the catalyst layer 6 may be such that a layer composed of a nickel cobalt spinel oxide is formed on the intermediate layer 4, and thereafter a layer composed of an iridium oxide is laminated thereon. Also, the thickness, density, and the like of the catalyst layer are not particularly limited, and may appropriately be set according to the intended purpose and the like of the electrode.

<Method for Producing Electrode for Electrolysis>

Next, a method for producing an electrode for electrolysis of the present invention will be described. The method for producing an electrode for electrolysis, which will be described below, is a method for producing the previously mentioned electrode for electrolysis, in which the intermediate layer is formed by a thermal decomposition method. It is to be noted that the method for forming the intermediate layer is not limited to the thermal decomposition method, and, for example, sputtering, ion plating, and plasma spraying can also be adopted.

The method for producing an electrode for electrolysis of the present invention, in which the thermal decomposition method is used, includes: a step (application step) of applying an aqueous solution containing a lithium ion and a nickel ion on a surface of an electrically conductive substrate; a step (intermediate layer formation step) of heat-treating the electrically conductive substrate having the aqueous solution applied thereon, thereby forming an intermediate layer containing a lithium-containing nickel oxide represented by composition formula $Li_xNi_{2-x}O_2$ (0.02≤x≤0.5) on the surface of the electrically conductive substrate; and a step (catalyst layer formation step) of forming a catalyst layer on a surface of the formed intermediate layer.

(Pre-Treatment Step)

The electrically conductive substrate is preferably subjected to a chemical etching treatment in advance in order to remove contaminating particles, such as metals and organic substances, on the surface thereof before performing the application step. The consumption of the electrically conductive substrate by the chemical etching treatment is preferably set to about 30 g/m² or more and about 400 g/m² or less. In addition, the surface of the electrically conductive substrate is preferably subjected to a surface-roughening treatment in advance in order to enhance the adhesiveness with the intermediate layer. The surface-roughening treatment includes: a blast treatment of spraying a powder; an etching treatment using an acid which can dissolve a substrate; plasma spraying; and the like.

(Application Step)

In the application step, an aqueous solution of a precursor, the aqueous solution containing a lithium ion and a nickel ion, is applied on the surface of the electrically conductive substrate. The intermediate layer is formed by a so-called thermal decomposition method. When the intermediate layer is formed by the thermal decomposition method, an aqueous solution of a precursor for the intermediate layer is first prepared. As a precursor containing a lithium component, a known precursor such as lithium nitrate, lithium carbonate, lithium chloride, lithium hydroxide, or a lithium carboxylate can be used. Examples of the lithium carboxylate include lithium formate and lithium acetate. As a precursor containing a nickel component, a known precursor such as nickel nitrate, nickel carbonate, nickel chloride, or a nickel carboxylate can be used. Examples of the nickel carboxylate include nickel formate and nickel acetate. It is particularly preferable that at least one of the lithium carboxylate and the nickel carboxylate be used as a precursor because a dense intermediate layer can thereby be formed even when calcination is performed at a low temperature as will be mentioned later.

When a lithium ion source and a nickel ion source are dissolved in water in such a way that the molar ratio of lithium to nickel falls within a range of Li:Ni=0.02:1.98 to 0.5:1.5, the aqueous solution of the precursor can thereby be prepared. It is to be noted that the concentration of the nickel ion source, such as a nickel carboxylate, is preferably set to 0.1 mol/L or more and 1 mol/L or less, more preferably 0.1 mol/L or more and 0.6 mol/L or less taking the solubility, the stability during storage, and the like into consideration.

The aqueous solution containing a lithium ion and a nickel ion is applied on the surface of the electrically conductive substrate. As an application method, a known method such as brush application, roller application, spin coating, or electrostatic coating can be utilized. Subsequently, if necessary, the electrically conductive substrate having the aqueous solution applied thereon is dried. The drying temperature is preferably set to a temperature where rapid evaporation of a solvent is avoided (for example, about 60 to about 80° C.)

(Intermediate Layer Formation Step)

In the intermediate layer formation step, the electrically conductive substrate having the aqueous solution applied thereon is heat-treated. Thereby, the intermediate layer containing a lithium-containing nickel oxide represented by composition formula $Li_xNi_{2-x}O_2$ (0.02≤x≤0.5) can be formed on the surface of the electrically conductive substrate.

The heat treatment temperature can appropriately be set. The heat treatment temperature is preferably set to 450° C. or higher and 600° C. or lower, more preferably 450° C. or higher and 550° C. or lower taking the decomposition temperature of the precursor and the production costs into consideration. For example, the decomposition temperature of lithium nitrate is about 430° C., and the decomposition temperature of nickel acetate is about 373° C. When the heat treatment temperature is set to 450° C. or higher, each component can thereby be decomposed more surely. When the heat treatment temperature is set in such a way as to exceed 600° C., oxidation of the electrically conductive substrate easily progresses, which increases the electrode resistance, so that an increase in the voltage loss is brought about in some cases. The heat treatment time may appropriately be set taking the reaction rate, the productivity, the oxidation resistance on the surface of the catalyst layer, and the like into consideration.

When the number of times of applying the aqueous solution in the previously mentioned application step is appropriately set, the thickness of the intermediate layer to be formed can thereby be controlled. It is to be noted that after the application of the aqueous solution and drying are repeated for every layer to form the uppermost layer, the whole may be heat-treated, or after the application of the aqueous solution and the heat treatment (pre-treatment) are repeated for every layer to form the uppermost layer, the whole may be heat-treated. The temperature during the pre-treatment and the temperature during the heat treatment of the whole may be the same or different. In addition, the time for the pre-treatment is preferably made shorter than the time for the heat treatment of the whole.

When the electrically conductive substrate having the aqueous solution applied thereon is heat-treated, the intermediate layer containing a lithium-containing nickel oxide is formed. The intermediate layer can be formed by performing the heat-treatment at a relatively low temperature, and therefore the reaction between nickel contained in the electrically conductive substrate and the components for forming the intermediate layer can be suppressed. That is, the molar ratio of lithium to nickel in the lithium-containing nickel oxide that constitutes the intermediate layer is substantially the same as the molar ratio of lithium to nickel in the aqueous solution.

(Catalyst Layer Formation Step)

In the catalyst layer formation step, the catalyst layer is formed on the surface of the intermediate layer formed in the previously mentioned intermediate layer formation step. As a method for forming the catalyst layer, a conventionally known technique is appropriately selected according to the type of the catalyst that constitutes the catalyst layer, and the method for forming the catalyst layer is not particularly limited. For example, the catalyst layer can also be formed by a method such as sputtering or arc ion plating in addition to a thermal decomposition method which is similar to the method for forming the intermediate layer. As mentioned above, when the catalyst layer is formed using a plurality of catalysts, a single-layered catalyst layer can be formed by mixing respective components. For example, in the case where a thermal decomposition method is used when a mixed catalyst layer is formed, a coating solution in which all of the precursors for respective catalysts are mixed is prepared, and this coating solution is applied on the intermediate layer to perform a heat treatment. In addition, the catalyst layer can also be formed by preparing coating solutions each containing a precursor for a catalyst that constitutes each layer and applying these coating solutions overlappingly.

(Heat Treatment Step)

The method for producing an electrode for electrolysis of the present invention preferably further includes a step of performing a heat treatment at 450° C. or higher and 600° C. or lower after forming the catalyst layer. When the heat treatment is performed after forming the catalyst layer, obtaining an effect such that the deterioration in electrolysis performance is further suppressed is thereby expected. The heat treatment temperature can appropriately be set. The heat treatment temperature is preferably set to 450° C. or higher and 600° C. or lower, more preferably 450° C. or higher and 550° C. or lower taking the decomposition temperature of the precursor, the production costs, and the like into consideration.

<Electrolysis Cell>

The electrode for electrolysis of the present invention can be used, for example, not only as an anode for electrolysis but also as a cathode for electrolysis. Further, the electrode for electrolysis of the present invention can also be used as a cathode for alkaline water electrolysis in addition to an anode for alkaline water electrolysis. That is, when the electrode for electrolysis of the present invention is used, an electrolysis cell, such as an alkaline water electrolysis cell, can be constituted. Hereinafter, constituent materials other than an anode in the case where an alkaline water electrolysis cell is constituted using the electrode for electrolysis of the present invention as an anode for alkaline water electrolysis will be described.

As a cathode, a substrate which is made of a material that is bearable to alkaline water electrolysis and a catalyst which gives a small cathode overvoltage are preferably selected and used. As a cathode substrate, a nickel substrate or a nickel substrate on which an active cathode is formed by coating can be used. Examples of the shape of the cathode substrate include expanded mesh and porous expanded mesh in addition to a sheet-like shape.

The cathode material includes porous nickel having a large surface area, Ni—Mo-based materials, and the like.

Besides, the cathode material also includes: Raney nickel-based materials, such as Ni—Al, Ni—Zn, and Ni—Co—Zn; sulfide-based materials, such as Ni—S; hydrogen-absorbing alloy-based materials, such as Ti$_2$Ni; and the like. As the catalyst, a catalyst having characteristics that hydrogen overvoltage is low, stability against short-circuit is high, poisoning resistance is high, etc. is preferable. As other catalysts, metals such as platinum, palladium, ruthenium, and iridium, and oxides thereof are preferable.

As a separator for electrolysis, asbestos, a non-woven fabric, an ion exchange membrane, a porous polymer membrane, a composite membrane of an inorganic substance and an organic polymer, or the like can be used. Specifically, an ion-permeable separator obtained by allowing an organic fiber fabric to internally exist in a mixture of a hydrophilic, inorganic material, such as a calcium phosphate compound or calcium fluoride, and an organic binder material, such as polysulfone, polypropylene, or polyvinylidene fluoride, can be used. In addition, an ion-permeable separator obtained by allowing a stretched, organic fiber fabric to internally exist in a film-forming mixture of a granular, inorganic, hydrophilic substance, such as an oxide or hydroxide of antimony or zirconium, and an organic binding agent, such as a fluorocarbon polymer, polysulfone, polypropylene, polyvinyl chloride, or polyvinyl butyral, can be used.

The use of the alkaline water electrolysis cell including the electrode for electrolysis of the present invention as a constituent enables electrolysis of a high-concentration alkali aqueous solution. As the alkali aqueous solution to be used as an electrolytic solution, an aqueous solution of an alkali metal hydroxide, such as potassium hydroxide (KOH) or sodium hydroxide (NaOH) is preferable. The concentration of the alkali aqueous solution is preferably 1.5% by mass or more and 40% by mass or less. In addition, the concentration of the alkali aqueous solution is preferably 15% by mass or more and 40% by mass or less because the electrical conductivity is large, so that the electric power consumption can be suppressed. Further, the concentration of the alkali aqueous solution is preferably 20% by mass or more and 30% by mass or less taking costs, corrosivity, viscosity, operability, and the like into consideration.

EXAMPLES

Hereinafter, the present invention will be described specifically based on Examples, but the present invention is not limited to these Examples. It is to be noted that "parts" and "%" in Examples and Comparative Examples are on a mass basis unless otherwise noted.

<Formation of Intermediate Layer (Production of Intermediate)>

(Sample 1)

Lithium nitrate (purity of 99%) and nickel acetate tetrahydrate (Ni(CH$_3$COO)$_2$.4H$_2$O, purity of 98.0%) were dissolved in pure water to obtain an aqueous solution having a molar ratio of lithium (Li) to nickel (Ni) of Li:Ni=0.1:1.9. The concentration of nickel acetate in the aqueous solution was set to 0.56 mol/L.

As an anode substrate, expanded mesh (10 cm×10 cm, LW×3.7 SW×0.9 ST×0.8 T) made of nickel was prepared. This expanded mesh was immersed in 17.5% by mass hydrochloric acid to be subjected to a chemical etching treatment near the boiling point for 6 minutes. The aqueous solution was applied, with a brush, on the surface of the anode substrate after the chemical etching treatment, and the applied aqueous solution was then dried at 60° C. for 10 minutes. Subsequently, a heat treatment was performed in an air atmosphere at 500° C. for 15 minutes. The treatments from applying the aqueous solution to the heat treatment were repeated 20 times to obtain an intermediate (sample 1) having an intermediate layer (composition: Li$_{0.1}$Ni$_{1.9}$O$_2$) formed on the surface of the anode substrate. The intermediate layer formed in the resultant intermediate had a thickness of 3.8 μm and a layer average density of 5.6 g/cm$^3$. FIG. 2 shows a SEM image of a cross section of the intermediate of sample 1.

<Samples 2 to 12>

Intermediates of samples 2 to 12 were each obtained by forming an intermediate layer in the same manner as in sample 1 mentioned previously, excluding each condition shown in Table 1. Table 2 shows the properties of the intermediate layer (oxide) in each resultant intermediate. In addition, FIGS. 3 to 13 each show a SEM image of a cross section of each resultant intermediate. The layer average density of each intermediate layer was calculated from equation (1) using the porosity of the intermediate layer, the porosity calculated by performing image analysis of a cross-sectional photograph (SEM image) of a section of the intermediate layer. It is to be noted that the porosity of each intermediate layer was calculated as a value of "porosity=area of pores/total area" from the number of pixels in a binarized SEM image using image processing software (image processing software which is an accessory of trade name "MSX-500Di" manufactured by MORITEX Corporation).

As an anode substrate, expanded mesh (10 cm×10 cm, LW×3.7 SW×0.9 ST×0.8 T) made of nickel was prepared. This expanded mesh was subjected to a blast treatment (0.3 MPa) with a 60-mesh alumina particle, and was then immersed in 20% by mass hydrochloric acid to be subjected to a chemical etching treatment near the boiling point for 6 minutes. The aqueous solution was applied, with a brush, on the surface of the anode substrate after the chemical etching

TABLE 1

| | Aqueous solution | | | | Heat treatment | | |
|---|---|---|---|---|---|---|---|
| | Raw material for Ni component | Raw material for Li component | Molar ratio of Li to Ni (Li:Ni) | Concentration of nickel acetate (nickel nitrate) (mol/L) | Temperature (° C.) | Time (min) | Number of times of repeating application to heat treatment |
| Sample 1 | Nickel acetate tetrahydrate | Lithium nitrate | 0.1:1.9 | 0.56 | 500 | 15 | 20 |
| Sample 2 | | | | | 600 | | |
| Sample 3 | | | 0.3:1.7 | | 500 | | |
| Sample 4 | | | | | 600 | | |
| Sample 5 | | | 0.5:1.5 | | 500 | | |
| Sample 6 | | | | | 600 | | |
| Sample 7 | Nickel nitrate hexahydrate | | 0.1:1.9 | 2 | 500 | | 8 |
| Sample 8 | | | | | 600 | | |
| Sample 9 | | | 0.3:1.7 | | 500 | | |
| Sample 10 | | | | | 600 | | |
| Sample 11 | | | 0.5:1.5 | | 500 | | |
| Sample 12 | | | | | 600 | | |

TABLE 2

| | Intermediate layer (oxide) | | | |
|---|---|---|---|---|
| | Composition | Thickness (μm) | Layer average density (g/cm$^3$) | SEM image |
| Sample 1 | $Li_{0.1}Ni_{1.9}O_2$ | 3.8 | 5.6 | FIG. 2 |
| Sample 2 | | 6.5 | 5.5 | FIG. 3 |
| Sample 3 | $Li_{0.3}Ni_{1.7}O_2$ | 6.7 | 5.8 | FIG. 4 |
| Sample 4 | | 6.5 | 5.8 | FIG. 5 |
| Sample 5 | $Li_{0.5}Ni_{1.5}O_2$ | 8.3 | 5.9 | FIG. 6 |
| Sample 6 | | 5.1 | 5.8 | FIG. 7 |
| Sample 7 | $Li_{0.1}Ni_{1.9}O_2$ | 5.1 | 5.0 | FIG. 8 |
| Sample 8 | | 7.7 | 3.6 | FIG. 9 |
| Sample 9 | $Li_{0.3}Ni_{1.7}O_2$ | 5.0 | — | FIG. 10 |
| Sample 10 | | 5.1 | — | FIG. 11 |
| Sample 11 | $Li_{0.5}Ni_{1.5}O_2$ | 5.1 | — | FIG. 12 |
| Sample 12 | | 6.1 | — | FIG. 13 |

As shown in Table 2 and FIGS. 2 to 13, it is found that when the acetate salt (carboxylic acid salt) is used as a precursor as in samples 1 to 6, an intermediate layer which has a small number of pores and is denser can thereby be formed even in the cases where the composition (molar ratio of Li to Ni) and the heat treatment temperature were changed. Moreover, in samples 7 to 12, the porosity of the intermediate layer is large, which can increase the surface area of the intermediate layer. Therefore, when a catalyst layer is provided on these intermediate layers, an effect of enabling enlargement of the effective area of the catalyst layer can be obtained.

<Production of Anode for Alkaline Water Electrolysis>

Examples 1

Lithium nitrate and nickel acetate tetrahydrate were dissolved in pure water to obtain an aqueous solution having a molar ratio of lithium (Li) to nickel (Ni) of Li:Ni=0.5:1.5. The concentration of nickel acetate in the aqueous solution was set to 0.56 mol/L.

treatment, and the applied aqueous solution was then dried at 80° C. for 15 minutes. Subsequently, a heat treatment was performed in an air atmosphere at 600° C. for 15 minutes. The treatments from applying the aqueous solution to the heat treatment were repeated 20 times to obtain an intermediate having an intermediate layer (composition: $Li_{0.5}Ni_{1.5}O_2$) formed on the surface of the anode substrate. The intermediate layer formed in the resultant intermediate had a thickness of 5.1 to 8.3 μm and a layer average density of 5.8 to 5.9 g/cm$^3$.

Nickel nitrate and cobalt nitrate were dissolved in pure water to obtain a coating solution having a molar ratio of nickel (Ni): cobalt (Co) of Ni:Co=33.3:66.7. After the resultant coating solution was applied on the surface of the intermediate layer in the intermediate in such a way that the amount of the metals per application was 1 g/m$^2$, the applied coating solution was dried at room temperature for 10 minutes and then at 60° C. for 10 minutes. Subsequently, thermal decomposition of performing a heat treatment in an air circulation type electric furnace at 350° C. for 15 minutes was performed. The treatments from applying the coating solution to the thermal decomposition were repeated 4 times to obtain an anode for alkaline water electrolysis (n=1 and 2) having a catalyst layer (composition: $NiCo_2O_4$) formed on the surface of the intermediate layer. The amount of the metals in the formed catalyst layer was 4 g/m$^2$.

Example 2

A hexaammineiridium solution was applied on the surface of the catalyst layer of the anode for alkaline water electrolysis obtained in Example 1 in such a way that the amount of the metal (Ir) per application was 1 g/m$^2$. Thereafter, thermal decomposition of performing a heat treatment in an air circulation type electric furnace at 350° C. for 15 minutes was performed. The treatments from applying the hexaammineiridium solution to the thermal decomposition were repeated 4 times to obtain an anode for alkaline water electrolysis having catalyst layers with a lamination structure having the first catalyst layer (composition: $NiCo_2O_4$) and the second catalyst layer (composition: $IrO_2$) each formed in the mentioned order on the surface of the intermediate layer. The amount of the metal in the formed second catalyst layer was 4 $g/m^2$.

Example 3

An iridium hydroxyacetochloride complex (hereinafter, written as "IrHAC") solution was applied on the surface of the catalyst layer of the anode for alkaline water electrolysis obtained in Example 1 in such a way that the amount of the metal (Ir) per application was 1.25 $g/m^2$. Thereafter, thermal decomposition of performing a heat treatment in an air circulation type electric furnace at 350° C. for 15 minutes was performed. The treatments from applying the IrHAC solution to the thermal decomposition were repeated 4 times to provide catalyst layers with a lamination structure having the first catalyst layer (composition: $NiCo_2O_4$) and the second catalyst layer (composition: $IrO_2$) each formed in the mentioned order on the surface of the intermediate layer. The amount of the metal in the formed second catalyst layer was 5 $g/m^2$. Thereafter, a heat treatment was performed in an air circulation type electric furnace at 540° C. for 60 minutes to obtain an anode for alkaline water electrolysis.

Comparative Example 1

Nickel nitrate and cobalt nitrate were dissolved in pure water to obtain a coating solution having a molar ratio of nickel (Ni): cobalt (Co) of Ni:Co=33.3:66.7. After the resultant coating solution was applied on the surface of the anode substrate after the chemical etching treatment, the anode substrate prepared in Example 1, in such a way that the amount of the metals per application was 1 $g/m^2$, the applied coating solution was dried at room temperature for 10 minutes and then at 60° C. for 10 minutes. Subsequently, thermal decomposition of performing a heat treatment in an air circulation type electric furnace at 350° C. for 15 minutes was performed. The treatments from applying the coating solution to the thermal decomposition were repeated 4 times to obtain an anode for alkaline water electrolysis having a catalyst layer (composition: $NiCo_2O_4$) formed directly on the surface of the anode substrate. The amount of the metals in the formed catalyst layer was 4 $g/m^2$.

<Evaluation>
(Shutdown Test)

A small-sized, zero-gap type electrolysis cell was prepared using each produced anode for alkaline water electrolysis as an anode and using a separator and a cathode. The electrode area was set to 19 $cm^2$. A 25% by mass KOH aqueous solution was used as an electrolytic solution, and the electrolytic solution was warmed to 80° C. to perform electrolysis with a current density of 4 $kA/m^2$ (Comparative Example 1), 6 $kA/m^2$ (Example 1), 10 $kA/m^2$ (Example 2), and 10 $kA/m^2$ (Example 3) for 6 hours. Subsequently, the anode and the cathode were made into a short-circuit state (0 $kA/m^2$), and the temperature was lowered to stop the electrolysis for 15 hours. Shutdown tests in which the operation from the electrolysis to the stop was counted as one cycle were performed. A graph showing relationships between the number of times of shutdown and the cell voltage is shown in FIG. 14.

As shown in FIG. 14, it is found that the cell voltage after stopping the electrolysis for the first time was somewhat lowered to be stabilized at a certain voltage in any of the electrolysis cells in which the alkaline water anodes for electrolysis of Example 1 (n=1, n=2), Example 2, and Example 3 were used. In addition, the electrolysis cells were disassembled after the tests to observe the separators, but a precipitate or the like was not produced. In contrast, it is found that the cell voltage gradually increased with the increase in the number of times of stops in the electrolysis cell in which the anode for alkaline water electrolysis of Comparative Example 1 was used. In addition, the electrolysis cell was disassembled after the tests to observe the separator, and it was found that precipitates derived from the catalyst and the anode substrate adhered.

(Accelerated Life Test)

An accelerated life test was performed using the alkaline water anodes for electrolysis of Example 1 (n=1) and Comparative Example 1, and a nickel sheet (Comparative Example 2; area of 1.0 $cm^2$, without intermediate layer and catalyst layer) each as a test sample according to the following procedure. Each test sample before the accelerated life test was first subjected to SSV (Slow Scan Voltammetry) under the condition shown below. The voltage and current density of each sample at the time of generating oxygen was calculated from the result of SSV.

Electrolytic solution; 25% by mass KOH aqueous solution, temperature 30° C.±1° C.
Potential range: 0.5 to 1.8 V
Scan speed: 5 mV/sec
Counter electrode: Ni coil
Reference electrode: Reversible hydrogen electrode (RHE)
Measurement atmosphere: Nitrogen atmosphere
Cycle number: 5 cycles Subsequently, CV (Cyclic Voltammetry) was performed in the same electrolytic solution under the condition described below. Further, SSV was performed under the above-described condition after each cycle was completed. A graph showing a change in the current density of each sample by the accelerated life test is shown in FIG. 15. FIG. 15 shows the current densities at a voltage of 1.6 V.

Potential range: 0.5 to 1.8 V
Scan speed: 1 V/sec
Cycle number: 0, 1,000, 3,000, 5,000, 10,000, 15,000, 20,000 cycles As shown in FIG. 15, it is clear that the difference between the initial activity and the activity after the progress of the cycle number is smaller, and the activity is less liable to be deteriorated even by the progress of the cycles in the anode for alkaline water electrolysis of Example 1 as compared to those in the anode for alkaline water electrolysis of Comparative Example 1 and in the nickel sheet of Comparative Example 2.

INDUSTRIAL APPLICABILITY

The electrode for electrolysis of the present invention is suitable as, for example, an anode for alkaline water electrolysis that constitutes electrolysis facilities and the like using electric power in which there is a large fluctuation in output, such as renewable energy, as a power source.

REFERENCE SIGNS LIST

2: Electrically conductive substrate
4: Intermediate layer
6: Catalyst layer
10: Electrode for electrolysis

The invention claimed is:

1. An anode of an electrolysis cell comprising:
   an electrically conductive substrate at least a surface of which comprises nickel or a nickel-based alloy;
   an intermediate layer formed on the surface of the electrically conductive substrate and comprising a lithium-containing nickel oxide represented by composition formula $Li_xNi_{2-x}O_2$, wherein x is in a range from 0.3 to 0.5; and
   a catalyst layer formed on a surface of the intermediate layer,
   wherein the catalyst layer comprises at least one catalyst selected from the group consisting of a nickel cobalt spinel oxide, a lanthanide nickel cobalt perovskite oxide, and a lithium nickel cobalt oxide,
   wherein the intermediate layer has a layer average density in a range from 5.1 g/cm$^3$ to 6.0 g/cm$^3$, and
   wherein the intermediate layer is a layer formed by heat-treating a precursor thereof at a temperature in a range from 450° C. to 600° C. on the surface of the electrically conductive substrate.

2. A method for producing the anode of an electrolysis cell according to claim 1, the method comprising:
   applying an aqueous solution comprising a lithium ion and a nickel ion on the surface of the electrically conductive substrate at least a surface of which comprises nickel or a nickel-based alloy;
   the heat-treating the electrically conductive substrate having the aqueous solution applied thereon at a temperature in a range from 450° C. to 600° C., thereby forming the intermediate layer comprising a lithium-containing nickel oxide represented by composition formula $Li_xNi_{2-x}O_2$, wherein x is in a range from 0.02 0.3 to 0.5, on the surface of the electrically conductive substrate, so that the intermediate layer having a layer average density in a range from 5.1 g/cm$^3$ to 6.0 g/cm$^3$ is formed; and
   forming the catalyst layer on the surface of the formed intermediate layer.

3. The method for producing the anode of an electrolysis cell according to claim 1, wherein the aqueous solution is prepared by dissolving in water, at least one material selected from the group consisting of a nickel carboxylate and a lithium carboxylate.

4. The method for producing the anode of an electrolysis cell according to claim 2, further comprising performing a heat treatment at a temperature in a range from 450° C. to 600° C. after the forming of the catalyst layer.

5. The anode of an electrolysis cell according to claim 1, wherein the catalyst layer is a laminate of a plurality of catalyst layers, wherein each of the plurality of catalyst layers comprises the at least one catalyst different from each other.

6. The anode of an electrolysis cell according to claim 1, wherein the catalyst layer comprises:
   a first catalyst layer formed on the surface of the intermediate layer; and
   a second catalyst layer formed on the first catalyst layer,
   wherein the first catalyst layer comprises the at least one catalyst different from the at least one catalyst in the second catalyst layer.

* * * * *